United States Patent
Henry

(10) Patent No.: US 11,098,177 B2
(45) Date of Patent: Aug. 24, 2021

(54) HEAT STABILIZED POLYVINYLIDENE FLUORIDE POLYMER COMPOSITION

(71) Applicant: Arkema Inc., King of Prussia, PA (US)

(72) Inventor: James J. Henry, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/025,361

(22) PCT Filed: Sep. 30, 2014

(86) PCT No.: PCT/US2014/058149
§ 371 (c)(1),
(2) Date: Mar. 28, 2016

(87) PCT Pub. No.: WO2015/048697
PCT Pub. Date: Apr. 2, 2015

(65) Prior Publication Data
US 2016/0215120 A1    Jul. 28, 2016

Related U.S. Application Data

(60) Provisional application No. 61/884,323, filed on Sep. 30, 2013.

(51) Int. Cl.
| C08K 5/19 | (2006.01) |
|---|---|
| C08F 14/22 | (2006.01) |
| C08K 5/50 | (2006.01) |
| C08F 20/04 | (2006.01) |

(52) U.S. Cl.
CPC ............... C08K 5/19 (2013.01); C08F 14/22 (2013.01); C08K 5/50 (2013.01); *C08F 20/04* (2013.01)

(58) Field of Classification Search
CPC .................. C08K 5/19; C08F 14/22
See application file for complete search history.

(56) References Cited

U.S. PATENT DOCUMENTS

| 3,154,519 | A | 10/1964 | Iserson |
|---|---|---|---|
| 3,728,303 | A | 4/1973 | Kometani et al. |
| 4,025,709 | A | 5/1977 | Blaise et al. |
| 4,299,958 | A | 11/1981 | Apotheker |
| 4,623,487 | A | 11/1986 | Cope |
| 5,688,884 | A | 11/1997 | Baker et al. |
| 5,789,508 | A | 8/1998 | Baker et al. |
| 7,012,122 | B2 | 3/2006 | Kappler et al. |
| 7,045,584 | B2 | 5/2006 | Kappler et al. |
| 7,294,668 | B2 * | 11/2007 | Zipplies ................ C08F 6/16 524/544 |
| 8,124,699 | B2 | 2/2012 | Durali et al. |
| 9,120,912 | B2 | 9/2015 | Zerafati |
| 2006/0135700 | A1 * | 6/2006 | Grootaert .............. C08F 214/18 525/326.2 |
| 2008/0015304 | A1 * | 1/2008 | Hintzer ................ C08F 2/24 524/544 |
| 2008/0281031 | A1 | 11/2008 | Judovits et al. |
| 2009/0186986 | A1 * | 7/2009 | Nomura ............. C08F 214/186 525/326.3 |
| 2009/0203864 | A1 | 8/2009 | Amin-Sanayei |
| 2012/0329923 | A1 | 12/2012 | Yen et al. |

FOREIGN PATENT DOCUMENTS

| CN | 101513190 | 8/2009 | |
|---|---|---|---|
| WO | WO2008/097684 | 8/2008 | |
| WO | WO-2012175414 A1 * | 12/2012 | ............. C08F 14/22 |

OTHER PUBLICATIONS

Xu, Yijin; Brittain, William J.; Vaia, Richard A.; Price, Gary, "Improving the physical properties of PEA/PMMA blends by the uniform dispersion of clay platelets", *Polymer* (2006), 47(13), 4564-4570. (Abstract Only).

* cited by examiner

*Primary Examiner* — Wenwen Cai
(74) *Attorney, Agent, or Firm* — Joanne Rossi

(57) ABSTRACT

Fluoropolymers, specifically polyvinylidene fluoride (PVDF) polymers stabilized against color degradation due to high thermal exposure. The fluoropolymers are produced with free-radical initiators in the presence of surfactants containing acid end groups. The fluoropolymer resins are melt processed into final articles at high temperatures, above the melting point of the polymer. While the fluoropolymer is stable, residual acid surfactant causes discoloration during thermal processing. Stabilization is achieved by the addition of small amounts of ammonium or phosphonium cations to the fluoropolymer composition. It is believed the cations react with any residual acid to form a less reactive salt. These salts do not adversely affect the color of a melt processed product. The phosphonium or ammonium ions can be added to the fluoropolymer at any point from the polymerization step up to the thermal processing step. A preferred family of salts are quaternary alkyl ammonium halides.

12 Claims, No Drawings

HEAT STABILIZED POLYVINYLIDENE FLUORIDE POLYMER COMPOSITION

This application claims benefit, under U.S.C. § 119 or § 365 of PCT Application Number PCT/US2014/058149, filed Sep. 30, 2014, and U.S. Provisional Application No. 61/884,323, filed Sep. 30, 2013, these documents being incorporated herein by reference.

FIELD OF THE INVENTION

The invention relates to fluoropolymers, and in particular polyvinylidene fluoride (PVDF) polymers that are stabilized against color degradation due to high thermal exposure. The fluoropolymers of the invention are produced with free-radical initiators in the presence of surfactants containing acid end groups—such as sulfonic acid. The fluoropolymer resins are melt processed into final articles at high temperatures, above the melting point of the polymer. While the fluoropolymer is stable, residual acid surfactant causes discoloration during thermal processing. Stabilization is achieved by the addition of small amounts of ammonium or phosphonium cations to the fluoropolymer composition. It is believed the cations react with any residual acid to form a less reactive salt. These salts do not adversely affect the color of a melt processed product. The phosphonium or ammonium ions in the form of an organic or inorganic salt can be added to the fluoropolymer at any point from the polymerization step up to the thermal processing step. A preferred family of salts are quaternary alkyl ammonium halides.

BACKGROUND OF THE INVENTION

Fluoropolymer resins possess various favorable physical properties such as marked toughness and high elasticity. They are resistant to harsh environments and provide weatherproof properties. They are widely used in both coating and melt-processable applications. In melt-processing applications, polyvinylidene fluoride (PVDF) can be easily processed on standard equipment without the need for extrusion aids, such as lubricants. These fluoropolymers are melt-processed to form polymer structures by many different processes, such as extrusion, coextrusion, injection molding, and blow molding.

Good physical properties are generally maintained by PVDF and polyvinyl fluoride (PVF) during the long heat history processes without the aids of heat stabilizers, though undesired discoloration can sometimes occur as a result of thermal processing.

Many methods have been proposed to reduce discoloration of fluoropolymers during the formation of articles and coatings. Many of these involve changes in the synthesis through a choice of initiator (U.S. Pat. No. 3,781,265), and (JP 58065711); special chain transfer agents (U.S. Pat. No. 4,569,978) (U.S. Pat. No. 6,649,720) and (EP 655468); delayed comonomer feeds (U.S. Pat. No. 6,187,885); and specific surfactants (EP 816397).

Improved properties for fluoropolymers have also been reported by the post-polymerization addition of additives such as octyltin compounds (JP62018457); zinc oxide additives (JP47038058); a phosphate and/or phosphonite processing stabilizer with a phenol antioxidant and a nucleating agent (GB2261667); a polyester plasticizer, phosphite and optionally a phenol compound (U.S. Pat. No. 6,843,948); a phosphite compound, and optionally a phenolic compound (WO9905211), and a phosphoaryl compound (WO 0897684).

Sodium/potassium chloride or sodium/potassium chlorate have been used for persulfate-initiated polymerizations. (U.S. Pat. No. 3,728,303)

US 2004/0225095 and US 2004/0225096 describe the use of sodium acetate to prevent discoloration in PVDF due to residual persulfate radical initiator fragments (from potassium persulfate initiator).

U.S. Pat. No. 3,154,519 describes discoloration of PVDF exposed to high temperatures when stabilized with salts of surfactants having sulfonic acid ends. The problem was solved by the addition of barium and strontium salts. These salts are more costly and more toxic than the salts of the present invention.

Due to adverse environmental issues, the EPA has sought to eliminate the use of perfluorooctanoate surfactants currently used in the manufacture of many fluoropolymers. Perfluoroalkyl acids, such as perfluoroalkylsulfonic acid having six fully fluorinated alkyl groups, represent an alternative. The sulfonic acid may be used in the acid or salt form. The acid form has the advantage of being more soluble in water, making it more effective as a surfactant (allowing for lower use levels than the salt form), and also making it easier to wash out in a post-polymerization washing step. However, the residual acid surfactant leads to discoloration of the fluoropolymer during thermal processing.

U.S. Pat. No. 4,025,709 discloses the use of the sulfonic acid salts as surfactants for fluoropolymer synthesis. While the use of the salt form of the surfactant provides better thermal stability, higher usage levels are required when compared to the acid form, and the residual surfactant salt is more difficult to wash out of the fluoropolymer, having a negative effect on the fluoropolymer purity. The reference also exemplifies only the use of persulfate initiators. Persulfate initiator residuals also lead to discoloration of the fluoropolymer in thermal processing. WO 97/08214 describes the use of perfluoroalkyl acids, such as perfluoroalkylsulfonic acid having six fully fluorinated alkyl groups as a surfactant in fluoropolymer polymerization.

CN101513190 and Polymer (2006), 47(13), 4564-4570 describe the use of an additive containing a montmorillonite long chain alkyl quaternary ammonium salt (such as dodecyl, tri-methyl ammonium bromide) to improve mechanical properties.

High-purity fluoropolymer resins, especially of PVDF, are used by the semiconductor industry. While washing of a PVDF resin removes much of the residual surfactant having acid end groups, the residual surfactant is still high enough to cause color stability issues during thermal processing. The use of metal cations to provide heat stabilization is problematic in semiconductor applications, as a very low level of extractable metals, low TOC and low anions are required.

There is a need for a process to form thermally stable fluoropolymers using no persulfate initiators that lead to yellowing, to use an acid-containing surfactant in the acid form to reduce the levels of surfactant, to increase the purity of the fluoropolymer product compared to the salt-form of the surfactant, and to produce a product having a low TOC, a very low level of metal cations, and a very low level of anions.

Applicant has found that a fluoropolymer can be polymerized using a free-radical initiator and in the presence of an acid surfactant (such as a sulfonic acid surfactant), then treated with an ammonium salt, and especially a quaternary ammonium salt, to neutralize the residual surfactant acid, thus reducing or preventing yellowing and discoloration during thermal processing. The salts are not barium, strontium or hydroxide salts. A preferred fluoropolymer contains primarily vinylidene fluoride monomer units. A preferred salt is a quaternary ammonium halide or acetate, as it contains no added metals, making it especially useful in the electronics industry, and in high purity applications. In addition to being useful in semiconductor and electronics applications, the low TOC and metal cation-containing PVDF is also useful as a resin in many food and water applications, and can meet many regulatory requirements.

While not being bound to any particular theory, it is believed that the cations of the ammonium salt will react with residual acid groups from the surfactant to produce a surfactant salt. The resultant acid-surfactant salts are less reactive than the acid, and do not adversely affect the color of a melt processed product.

SUMMARY OF THE INVENTION

The invention relates to a heat stabilized fluoropolymer composition containing a fluoropolymer which is preferably a PVDF polymer or copolymer; from 0.001 to 600 ppm of residual acid end groups, and preferably from 100 to 400 ppm; and from 1 to 30,000 ppm of one or more ammonium or phosphonium salts, other than a hydroxide, or one containing strontium or barium cations.

The invention also relates to a process for producing a thermally stable fluoropolymer comprising the steps of:
a) polymerizing one or more monomers comprising at least 50 mole percent of one or more fluoromonomers in the presence of an organic free-radical initiator and one or more surfactant(s) having acid end groups, to form a fluoropolymer;
b) admixing from 1 to 30,000 ppm of one or more ammonium or phosphonium salts with said fluoropolymer to form a fluoropolymer composition, wherein said salt(s) is added at one or more points between the start of said polymerization and the heat processing of the fluoropolymer composition, wherein said salt is not a hydroxide, and does not contain strontium of barium cations.

The invention further relates to the thermally stable fluoropolymer product formed by the process, and the uses of the thermally stable fluoropolymer, especially in the area of electronics applications.

DETAILED DESCRIPTION OF THE INVENTION

The invention relates to the stabilization of PVDF and other fluoropolymers by ammonium or phosphonium cations. The fluoropolymers are polymerized in the presence of surfactants containing acid end groups, such as sulfonic acid surfactants, and is preferably polymerized using an organic free radical initiator. The invention also relates to a stabilized fluoropolymer composition containing the fluoropolymer and residual acid-end-group surfactants neutralized by an ammonium salt.

The fluoropolymer of the invention is one formed primarily of fluoromonomers. The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The fluoropolymer preferably contains at least 50 mole percent of one or more fluoromonomers.

Fluoromonomers useful in the practice of the invention include, for example, vinylidene fluoride (VDF), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3, 3-trifluoropropene a fluorinated vinyl ether, a fluorinated allyl ether, a non-fluorinated allyl ether, a fluorinated dioxole, and combinations thereof.

Especially preferred polymers are homopolymers of VDF, and copolymers made by the process of the invention are copolymers of VDF with HFP, TFE or CTFE, comprising from about 50 to about 99 weight percent VDF, more preferably from about 70 to about 99 weight percent VDF.

Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

Acrylic-modified PVDF, a hybrid polymer formed by polymerizing one or more acrylic monomers in the presence of a fluropolymer (preferably a PVDF) seed polymer, is also included in the invention.

The fluoropolymers of the invention can be made by means known in the art, such as by an emulsion, suspension, solution, or supercritical $CO_2$ polymerization process. Preferably the fluoropolymer is formed by an emulsion or suspension process.

The fluoropolymer is polymerized using a free-radical initiator. Especially useful initiators are the organic peroxide initiators. Among the organic peroxides which can be used for the polymerization are the classes of dialkyl peroxides, diacyl-peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate, diisopropyl peroxydicarbonate. The quantity of an initiator required for a polymerization is related to its activity and the temperature used for the polymerization. The total amount of initiator used is generally between 100 to 2000 ppm by weight on the total monomer weight used. Typically, sufficient initiator is added at the beginning to start the reaction and then additional initiator may be optionally added to maintain the polymerization at a convenient rate. Other free radical initiators may also be used, though some initiators, such as persulfate initiators, tend to discolor during thermal processing due to residual persulfate.

The fluoropolymers of the invention are polymerized in the presence of surfactants having acid end groups. The surfactant end groups during polymerization are preferably in the acid form, and are not neutralized. It is the residual acid end groups in the surfactant which are believed to lead to the discoloration of the fluoropolymer composition exposed to high heat. Examples of surfactant acid end groups would include, but not be limited to sulfonic acid, carboxylic acid, and phosphonic acid. In one embodiment, the surfactant is a fluorosurfactant having a chain length of $C_4$ to $C_{10}$ and could be an alkyl, ether or aryl group. This surfactant could be fully fluorinated (perfluoro-), partially fluorinated or non-fluorinated, as long as it contains the acid functionality. Combinations of surfactants are also envisioned, provided acid end groups are present on one or more of the surfactants.

Ammonium organic or inorganic salts are used to neutralize the surfactant acid end groups. Preferably the salts are water soluble and are not hydroxides. Water-soluble salts are preferred, since they can be added to the fluoropolymer as a water solution. This allows for easier handling and better dispersion, increasing the chance of reaction and allowing for a minimal usage of salt. By "water soluble" as used herein is meant that at least 3 grams, preferably at least 10 grams, and most preferably at least 20 grams of the salt will dissolve in 100 milliliters of water at 25° C.

Useful ammonium salts include, but are not limited to ammonium acetate, ammonium aluminum chloride, ammonium bromide, ammonium sulfate, ammonium aluminum sulfate, ammonium borates, ammonium stannate, ammonium carbamate, ammonium carbonate, ammonium chlorate, ammonium chloride, ammonium sulfamate, ammonium citrate, ammonium fluoride, ammonium fluorosulfonate, ammonium fluorosilicate, ammonium formate, ammonium hydroxide, ammonium lactate, ammonium laurate, ammonium magnesium carbonate, ammonium magnesium chloride, ammonium magnesium selenate, ammonium magnesium sulfate, ammonium malate, ammonium molybdate, ammonium nitrate, ammonium oleate, ammonium nitrite, ammonium oxalate, ammonium palmitate, ammonium phosphates, ammonium picrate, ammonium salicylate, ammonium sodium phosphate, ammonium stearate, ammonium succinate, ammonium sulfate, ammonium sulfides, ammonium tartrate, ammonium valerate, ammonium zinc sulfate, ammonium sulfamate, ammonium benzoate, ammonium nickel chloride, ammonium sulfites, ammonium propionate, ammonium phosphotungstate, Preferred ammonium salts are the quaternary ammonium salts. Quaternary ammonium salts useful in the invention include, but are not limited to tetra-alkyl ammonium halides and tetra-alkyl ammonium acetate. The alkyl groups may be the same or different, and are preferably chosen from $C_{1-18}$ alkyl groups, preferably $C_{1-8}$ alkyl groups, and most preferably from $C_{1-4}$ alkyl groups—though alkyl-aryl and aryl quaternary ammonium compounds are also useful. Useful quaternary ammonium halides include, but are not limited to tetramethyl ammonium chloride, tetraethyl ammonium chloride, tetrapropyl ammonium chloride, and tetrabutyl ammonium chloride, tetramethyl ammonium bromide, tetraethyl ammonium bromide, tetrapropyl ammonium bromide, tetrabutyl ammonium bromide, tetrabutyl ammonium acetate, hexadecyltrimethyl ammonium bromide, tetramethyl ammonium fluoride, tetraethyl ammonium fluoride, tetrapropyl ammonium fluoride, and tetrabutyl ammonium fluoride, tetramethyl ammonium iodide, tetraethyl ammonium iodide, tetrapropyl ammonium iodide, and tetrabutyl ammonium iodide.

In another embodiment, phosphonium salts are used. Useful phosphonium salts include, but are not limited to Phosphonium acetate, phosphonium aluminum chloride, phosphonium bromide, phosphonium sulfate, phosphonium aluminum sulfate, phosphonium borates, phosphonium stannate, phosphonium carbamate, phosphonium carbonate, phosphonium chlorate, phosphonium chloride, phosphonium sulfamate, phosphonium citrate, phosphonium fluoride, phosphonium fluorosulfonate, phosphonium fluorosilicate, phosphonium formate, phosphonium hydroxide, phosphonium lactate, phosphonium laurate, phosphonium magnesium carbonate, phosphonium magnesium chloride, phosphonium magnesium selenate, phosphonium magnesium sulfate, phosphonium malate, phosphonium molybdate, phosphonium nitrate, phosphonium oleate, phosphonium nitrite, phosphonium oxalate, phosphonium palmitate, phosphonium phosphates, phosphonium picrate, phosphonium salicylate, phosphonium sodium phosphate, phosphonium stearate, phosphonium succinate, phosphonium sulfate, phosphonium sulfides, phosphonium tartrate, phosphonium valerate, phosphonium zinc sulfate, phosphonium sulfamate, phosphonium benzoate, phosphonium nickel chloride, phosphonium sulfites, phosphonium propionate, ammonium phosphotungstate, Halide salts and acetate salts of the phosphonium or ammonium salts are preferred, with the chloride and bromide salts being most preferred. Salts of barium and strontium are not included in the invention.

When an acetate reacts with the acid group, the acetate forms a volatile species that can be removed during pelletization lowering contamination levels (measured as total organic compounds or TOC's).

The ammonium salts of the invention may be used in combination with metal cation salts—especially in applications where very low levels of residual metals are not a concern. Other metal salts include, but are not limited to sodium salts, calcium salts, potassium salts, zinc salts, and lithium salts. The quaternary ammonium salts, and especially the halides or acetate salts are useful in applications where the trace metals from the surfactant are undesired. Ammonium salts other than the quaternary ammonium salts are useful, but found to be less effective.

Blends of more than one type of salt is also contemplated by the invention. In one embodiment, a quaternary ammonium acetate or halide is combined with a small amount of a metal salt, such as sodium acetate or zinc oxide, and a synergistic effect is observed in terms of improvement of thermal stability and reduced coloring.

The level of salt useful in the invention is dependent on the amount of residual acid-containing surfactant in the fluoropolymer. Fluoropolymers that have been washed or otherwise treated and dewatered during or after the manufacturing process will require less salt, as they have lower levels of residual acid groups. Generally the level of salt needed is from 1 to 30,000 ppm, preferably from 1 to 5,000 ppm, preferably 3-1000 ppm, and most preferably for washed or treated samples with low levels of residual surfactant 3-100 ppm is used based on fluoropolymer solids. In one embodiment 100-420 ppm of sodium acetate trihydrate (60 to 250 ppm anhydrous) was found to be effective. In another embodiment, 1-100 ppm of tetraalkyl ammonium bromide is used on a washed or treated fluoropolymer having a lower level of residual surfactant. For other salts, a similar stoicheometric equivalent amount is useful (ie. for calcium acetate a level of 20 to 970 ppm would be useful).

The salts are combined with the fluoropolymer at any point during or after polymerization, and prior to processing at elevated temperatures. This includes, but is not limited to adding the salt into the reactor during polymerization or once polymerization has been completed; adding the salt into the polymer solution/suspension/emulsion just prior to drying (by means known in the art such as spray drying, or coagulation and drying); by adding the salt (preferably as a water solution spray) to the dried fluoropolymer at any point between drying and up to and including pelletization; etc., or by any combination thereof. Preferably the salt is added as an aqueous salt solution. One preferred method is to add the salt into the fluoropolymer solution/emulsion/dispersion just prior to drying—or as a separate stream simultaneously added as the fluoropolymer enters the drier. If the fluoropolymer is washed, the addition of the salt should occur after washing and before melt processing.

It can be advantageous to wash the fluoropolymer to remove some residual initiator, surfactant and other impurities, to provide a purer final product. In one embodiment, the fluoropolymer dispersion/solution/latex is washed, optionally after it is coagulated, to remove residuals and impurities and produce a higher purity product. The salt is then added after the washing step(s). Washing of the fluoropolymer should reduced the level of residual surfactant to below 500 ppm, preferably below 300 ppm, and more preferably below 200 ppm, based on the level of polymer solids.

It can also be advantageous to spray dry the fluoropolymer to remove additional residual initiator, surfactant and other impurities prior to the addition of the salt. The salt is then added during pelletization by either spraying a salt solution directly onto the fluoropolymer powder or by direct addition of a salt solution directly into the pelletization extruder.

The fluoropolymer composition of the invention may also include typical additives, including, but not limited to, dyes; colorants; impact modifiers; antioxidants; flame-retardants; ultraviolet stabilizers; flow aids; conductive additives such as metals, carbon black and carbon nanotubes; defoamers; crosslinkers; waxes; solvents; plasticizers; and anti-static agents. Other additives that provide whitening could also be added to the fluoropolymer composition, including, but not limited to metal oxide fillers, such as zinc oxide; and phosphate stabilizers.

The fluoropolymer composition of the invention can be melt-processed to form polymer structures by many different processes, such as extrusion, injection molding, fiber spinning, extrusion blow molding and blown film. The fluoropolymer composition resists discoloration at the elevated heat profiles in these processes.

It is also anticipated as part of the invention that addition of the salts to form a fluoropolymer composition could be applied to fluoropolymer coatings—especially those requiring high-temperature curing, to provide protection against discoloration.

The fluoropolymer composition of the invention could also be used to prevent or retard discoloration in other environments known to cause discoloration, such as exposure of the fluoropolymer to acids and oxidizing environments.

The heat stable fluoropolymer composition of the invention is especially useful in applications requiring high purity, low total organic compounds (TOC), low anions, a low metal content, and white color. Applications with these requirements include the semiconductor and electronics industries, as well as food, potable water and pharmaceutical uses.

As shown in the Examples, the addition of the salts of the invention to a PVDF polymer produced a composition having a very good heat resistance, as shown with a whiteness (as measured by YI) after heat-treatment of less than 40, less than 30, and even less than 20.

EXAMPLES

Example 1

Comparative 60 grams of KYNAR 740 PVDF homopolymer resin polymerized in the presence of ZONYL 1033D (a perfluoroalkylsulfonic acid having six fully fluorinated alkyl groups, from DuPont) was blended with 1% solutions of the additives listed in Table 1 in a BRABENDER Plastometer under the following conditions:

Duration: 10 minutes
Sample Size: 60 grams of powder
Additive: 1% solutions of additive with water.
Method of mixing: weigh out sample and add the additive to the KYNAR 740 powder directly in a PE bag. Mix thoroughly.
Temperature: 205 C
Rotation Speed: 45 rpm
Sample Preparation: Remove melted polymer from the brabender bowl after mixing, press out sample for 1 minute @ 400 F, 10,000 psi, Cool press for 10 minutes in RT press @ 10,000 psi.
The YI values were measured by ASTM D1925 using a MINOLTA CR-300 Chromameter.

The results from this experiment can be found in Table 1:

TABLE 1

| KYNAR Resin | Additive | Additive amount (ppm) | Observation | Measured YI |
| --- | --- | --- | --- | --- |
| 60 g PVDF lot 2008040 | None | Na | Dark Yellow | 32 |
| 60 g PVDF lot 2008040 | NaAc | 100 | White | <10 |
| 60 g PVDF lot 2008040 | NaAc | 50 | Off White | 15-17 |
| 60 g PVDF lot 2008040 | CaAc | 100 | White | <10 |
| 60 g PVDF lot 2008040 | NaCl | 100 | White | <10 |
| 60 g PVDF lot 2008040 | NH4Ac | 100 | Yellow | 25-27 |
| 60 g PVDF lot 2008040 | KAc | 100 | White | <10 |
| 60 g PVDF lot 2008040 | ZnAc | 100 | White | <10 |

It was shown in this experiment that sodium, zinc, potassium and calcium were all effective, indicating that many metal cations may be useful. It was shown that both the organic NaAc (sodium acetate) as well as NaCl (sodium chloride) indicating that both organic and inorganic additives could be useful. It was also shown that the ammonium ion NH4 could be useful for color improvement, but not to the same level as observed with the additives having a metal cation.

Example 2

Comparative 60 grams of KYNAR 740 PVDF homopolymer resin polymerized in the presence of ZONYL 1033D (a perfluoroalkylsulfonic acid having six fully fluorinated alkyl groups, from. DuPont) was blended with various levels of a 1% calcium acetate solution in a BRABENDER Plastometer following conditions described in example 1. The results from this experiment can be found in Table 2.

TABLE 2

| KYNAR Resin | Additive | Additive amount (ppm) | Observation | Measured YI |
| --- | --- | --- | --- | --- |
| 60 g PVDF homopolymer | None | 0 | Dark Yellow | 38 |
| 60 g PVDF homopolymer | CaAc | 50 | Off White | 24 |
| 60 g PVDF homopolymer | CaAc | 100 | White | 8 |
| 60 g PVDF homopolymer | CaAc | 200 | White | 14 |
| 60 g PVDF homopolymer | CaAc | 300 | Off White | 22 |
| 60 g PVDF homopolymer | CaAc | 400 | Off White | 28 |

Example 3

Comparative 60 grams of KYNAR copolymer resin polymerized in the presence of ZONYL 1033D (a perfluoroalkylsulfonic acid having six fully fluorinated alkyl groups, from DuPont) was blended with various levels of a 1% sodium acetate solution in a BRABENDER Plastometer following conditions described in example 1. The results from this experiment can be found in Table 3.

TABLE 3

| KYNAR Resin | Additive | Additive amount (ppm) | Measured YI |
|---|---|---|---|
| 60 g PVDF copolymer | None | 0 | −1 |
| 60 g PVDF copolymer | NaAc | 30 | −17 |
| 60 g PVDF copolymer | NaAc | 50 | −12 |
| 60 g PVDF copolymer | NaAc | 75 | −12 |
| 60 g PVDF copolymer | NaAc | 100 | −10 |
| 60 g PVDF copolymer | NaAc | 150 | 0 |

Example 4

60 grams of KYNAR 740 PVDF homopolymer resin polymerized in the presence of ZONYL 1033D (a perfluoroalkylsulfonic acid having six fully fluorinated alkyl groups, from DuPont) was blended with various levels of a 1% tetrabutyl ammonium chloride (TBAC) solution in a BRABENDER Plastometer following conditions described in example 1. The results from this experiment can be found in Table 4.

TABLE 4

| KYNAR Resin | Additive | Additive amount (ppm) | Measured YI |
|---|---|---|---|
| 60 g PVDF homopolymer | None | 0 | 44 |
| 60 g PVDF homopolymer | TBAC | 50 | 40 |
| 60 g PVDF homopolymer | TBAC | 100 | 29 |
| 60 g PVDF homopolymer | TBAC | 175 | 14 |
| 60 g PVDF homopolymer | TBAC | 200 | 12 |
| 60 g PVDF homopolymer | TBAC | 225 | 7 |
| 60 g PVDF homopolymer | TBAC | 250 | 18 |
| 60 g PVDF homopolymer | TBAC | 300 | 45 |

Example 5

60 grams of KYNAR copolymer resin polymerized in the presence of ZONYL 1033D (a perfluoroalkylsulfonic acid having six fully fluorinated alkyl groups, from DuPont) was blended with various levels of a 1% tetrabutyl ammonium chloride (TBAC) solution in a BRABENDER Plastometer following conditions described in example 1. The results from this experiment can be found in Table 5.

TABLE 5

| KYNAR Resin | Additive | Additive amount (ppm) | Measured YI |
|---|---|---|---|
| 60 g PVDF copolymer | None | 0 | 2.69 |
| 60 g PVDF copolymer | TBAC | 50 | −2.99 |
| 60 g PVDF copolymer | TBAC | 75 | −8.49 |
| 60 g PVDF copolymer | TBAC | 100 | −11.5 |
| 60 g PVDF copolymer | TBAC | 125 | −15.53 |
| 60 g PVDF copolymer | TBAC | 150 | 1.15 |

Example 6

60 grams of KYNAR 740 PVDF homopolymer resin polymerized in the presence of ZONYL 1033D (a perfluoroalkylsulfonic acid having six fully fluorinated alkyl groups, from DuPont) was blended with various levels of a 1% tetraethyl ammonium chloride (TEAC) solution in a BRABENDER Plastometer following conditions described in example 1. The results from this experiment can be found in Table 6.

TABLE 6

| KYNAR Resin | Additive | Additive amount (ppm) | Measured YI |
|---|---|---|---|
| 60 g PVDF homopolymer | None | 0 | 37 |
| 60 g PVDF homopolymer | TEAC | 33 | 32 |
| 60 g PVDF homopolymer | TEAC | 67 | 20 |
| 60 g PVDF homopolymer | TEAC | 100 | 11 |
| 60 g PVDF homopolymer | TEAC | 117 | 15 |
| 60 g PVDF homopolymer | TEAC | 133 | 21 |
| 60 g PVDF homopolymer | TEAC | 167 | 51 |

Example 7

60 rams of KYNAR 740 PVDF homopolymer resin polymerized in the presence of ZONYL 1033D (a perfluoroalkylsulfonic acid having six fully fluorinated alkyl groups, from DuPont) was blended with various levels of either 1% tetrabutyl ammonium fluoride (TEAL) or a 1% tetrabutyl ammonium acetate (TBAAc) solution in a BRABENDER Plastometer following conditions described in example 1. The results from this experiment can be found in Table 7.

TABLE 7

| KYNAR Resin | Additive | Additive amount (ppm) | Observation | Measured YI |
|---|---|---|---|---|
| 60 g PVDF homopolymer | None | 0 | Yellow | 41 |
| 60 g PVDF homopolymer | TBAF | 50 | Orange | >41 |
| 60 g PVDF homopolymer | TBAF | 100 | Orange | >41 |
| 60 g PVDF homopolymer | TBAF | 150 | Orange | >41 |
| 60 g PVDF homopolymer | TBAF | 200 | Orange | >41 |
| 60 g PVDF homopolymer | TBAAc | 150 | Off White | 30 |
| 60 g PVDF homopolymer | TBAAc | 200 | Off White | 30 |
| 60 g PVDF homopolymer | TBAAc | 250 | Brown | 130 |

What is claimed is:

1. A heat stabilized fluoropolymer composition consisting of:
   a) a melt processable fluoropolymer,
   b) 1-30,000 ppm of tetrabutyl ammonium chloride or tetraethyl ammonium chloride, and c) 0.001 ppm-600 ppm of residual surfactant having acid end groups, wherein acid end groups on the surfactant are selected from the group consisting of sulfonic acid and carboxylic acid end groups, and wherein the monomers of said melt processable fluoropolymer are selected from the group consisting of vinylidene fluoride (VDF), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene, and combinations thereof, and wherein the monomers comprise from about 65 to 100 weight percent vinylidene fluoride.

2. The composition of claim 1, wherein the level of residual surfactant having acid end group is from 100 to 400 ppm.

3. The composition of claim 1, wherein the acid end groups on the residual surfactant are sulfonic acid end groups.

4. The composition of claim 1, wherein the residual surfactants do not contain fluorine.

5. The composition of claim 1, wherein the residual surfactants having acid end groups are fluorinated or perfluorinated surfactants having a chain length of from $C_4$ to $C_{10}$.

6. A process for producing the heat stabilized fluoropolymer composition of claim 1, comprising the steps of:
  a) polymerizing one or more monomers in the presence of an organic free-radical initiator and one or more surfactant(s) having acid end groups to form a first fluoropolymer composition comprising a melt processable fluoropolymer;
  b) washing the first fluoropolymer composition to reduce the surfactant having acid end groups to a concentration in the range of from 0.001 ppm-600 ppm to form a second fluoropolymer composition,
  c) drying the second fluoropolymer composition to obtain the heat stabilized fluoropolymer composition,
  wherein from 1 to 30,000 ppm of ammonium salt(s) is added at one or more points between the start of the polymerization to just prior to the drying step, wherein said ammonium salts are selected from the group consisting of tetrabutyl ammonium chloride, tetraethyl ammonium chloride, and a combination thereof,
  wherein the acid end groups on the surfactant are selected from the group consisting of sulfonic acid and carboxylic acid end groups,
  wherein the monomers of the melt processable fluoropolymer are selected from the group consisting of vinylidene fluoride (VDF), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene, and combinations thereof, and wherein the monomers comprises from about 65 to 100 weight percent vinylidene fluoride.

7. The process of claim 6, wherein the organic free-radical initiator is a peroxide.

8. The process of claim 6, wherein the washing step is carried out prior to the admixing with the ammonium salt(s).

9. The process of claim 6, wherein said polymerization occurs in an aqueous medium and the melt processable fluoropolymer is in the form of an aqueous solution, dispersion, or emulsion when admixed with the ammonium salt(s).

10. The process of claim 6, wherein the ammonium salt(s) is added after the washing step and before the drying step.

11. An electronic article comprising the heat stabilized fluoropolymer composition of claim 1.

12. A process for producing the heat stabilized fluoropolymer composition of claim 1, comprising the steps of:
  a) polymerizing one or more monomers in the presence of an organic free-radical initiator and one or more surfactant(s) having acid end groups to form a first fluoropolymer composition comprising a melt processable fluoropolymer;
  b) washing the first fluoropolymer composition to reduce the surfactant having acid end groups to a concentration in the range of from 0.001 to 600 ppm to form a second fluoropolymer composition,
  c) drying the second fluoropolymer composition to obtain a dry fluoropolymer powder,
  d) admixing from 1 to 30,000 ppm of one or more ammonium salts with the dry fluoropolymer powder to form the heat stabilized fluoropolymer composition,
  wherein said ammonium salts are selected from the group consisting of tetrabutyl ammonium chloride, tetraethyl ammonium chloride, and a combination thereof,
  wherein the acid end groups on the surfactant are selected from the group consisting of sulfonic acid and carboxylic acid end groups,
  wherein the monomers of the melt processable fluoropolymer are selected from the group consisting of vinylidene fluoride (VDF), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene, and combinations thereof, and wherein the monomers comprises from about 65 to 100 weight percent vinylidene fluoride.

* * * * *